United States Patent [19]

Chen, Sr. et al.

[11] Patent Number: 4,963,628
[45] Date of Patent: Oct. 16, 1990

[54] COMPOSITIONS OF POLYBENZIMIDAZOLES AND POLYARYLATES

[75] Inventors: Paul N. Chen, Sr., Gillette; Tai-Shung Chung, Morris Plains; Paul J. Harget, West Milford, all of N.J.

[73] Assignee: Hoechst Celanese Corp., Somerville, N.J.

[21] Appl. No.: 89,650

[22] Filed: Aug. 26, 1987

[51] Int. Cl.$^5$ .................. C08L 67/02; C08L 79/06
[52] U.S. Cl. .................................. 525/425; 8/115.54
[58] Field of Search ......................................... 525/425

[56] References Cited

U.S. PATENT DOCUMENTS 4,113,683  9/1978  Kalnin et al. ................. 525/432

FOREIGN PATENT DOCUMENTS 62-146944A  6/1987  Japan .

Primary Examiner—Ana L. Carrillo
Attorney, Agent, or Firm—Kenneth E. Macklin

[57] ABSTRACT

A novel miscible composition comprising from about 5 parts by weight to about 95 parts by weight of a polyarylate and from about 95 parts by weight to about 5 parts by weight of an aromatic polybenzimidazole. In a composition mostly comprised of an aromatic polybenzimidazole, it is preferred that the polyarylate be present in the composition in an amount sufficient to make the aromatic polybenzimidazole more thermally processable and also less susceptible to moisture. More preferably, such compositions are comprised of from about 60 parts by weight to about 95 parts by weight of an aromatic poloybenzimidazole and from about 40 parts by weight to about 5 parts by weight of a polyarylate. Most preferably, such compositions are comprised of at least about 10 parts by weight of a polyacrylate. In a composition mostly comprised of a polyarylate, it is preferred that the aromatic polybenzimidazole be present in an amount sufficient to render the polyarylate less sensitive to solvents, and to increase the thermal stability of the polyarylate. Preferably, the aromatic polybenzimidazole is present in such compositions in an amount sufficient to result in a composition with greatly enhanced solvent resistance. More preferably, such compositions are comprised of from about 60 parts by weight to about 95 parts by weight of a polyarylate and from about 40 parts by weight to about 5 parts by weight of an aromatic polybenzimidazole. Most preferably, such compositions should contain at least about 25 to about 30 parts by weight of a polybenzimidazole in order to render the polyarylate component much more resistant to solvents at room temperature. In addition to improving solvent resistance, greater amounts of aromatic polybenzimidazole in the composition substantially increase the thermal and physical properties of the composition, giving excellent price-performance characteristics. The compositions, particularly in the form of films or fibers, may be post-treated with heat or sulfuric acid in order to minimize their shrinkage when subsequently subjected to heat and in order to increase their resistance to solvents and acid.

18 Claims, 10 Drawing Sheets

MODULUS OF PBI/PA FILMS

FT-IR CONFIRMATION OF THE EXISTENCE OF INTER-MOLECULAR HYDROGEN BONDING BETWEEN PBI AND PA

CARBONYL BAND SHIFTING DUE TO H-BONDING

RESIDUAL SOLVENT (NMP) IN PBI/PA FILMS

FT-IR Studies Of Thermally Treated PBI/PA (80/20) Film

COMPOSITIONS OF POLYBENZIMIDAZOLES AND POLYARYLATES

This invention is concerned with a novel composition comprising a polyarylate and an aromatic polybenzimidazole. The novel compositions are suitable for the formation of coatings, fibers, films, thermoplastic molding compositions, and the like.

BACKGROUND OF THE INVENTION

The number of known classes of high performance polymers which are useful under severe environmental conditions is limited. In addition, some of the known classes of polymers are deficient in some properties, e.g., physical properties, solvent and thermal resistance, and processability. Some are also quite expensive.

PRIOR ART

High temperature aromatic polyesters are the condensation product of aromatic dicarboxylic acids and aromatic diols and are characterized as generally having high glass transition temperatures and high heat distortion temperatures.

Representative publications which discuss wholly aromatic polyesters include: (a) Polyesters of Hydroxybenzoic Acids, by Russell Gilkey and John R. Caldwell, J. of Applied Polymer Sci., Vol. II, Pages 198 to 202 (1959), (b) Polyarylates (Polyesters From Aromatic Dicarboxylic Acids and Bisphenols), by G. Bier, Polymer, Vol. 15, Pages 527 to 535 (August 1974), (c) Aromatic Polyester Plastics, By S. G. Cottis, Modern Plastics, Pages 62 to 63 (July 1975), and (d) Poly(p-Oxybenzoyl Systems): Homopolymer for Coatings: Copolymers for Compression and Injection Molding, by Roger S. Storm and Steve G. Cottis, Coatings Plast. Preprint, Vol. 34, No. 1, Pages 194 to 197 (April, 1974). See also, U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; and 3,890,256, as well as U.S. patent application Ser. No. 686,191, filed May 13, 1976, and U.S. patent application Ser. No. 686,189, filed May 13, 1976, which are herein incorporated by reference.

Additional polyarylates are described in U.S. Pat. Nos. 3,038,364 (Apr. 3, 1962); 3,216,970 (Nov. 9, 1965); 3,230,195 (Jan. 18, 1966); 3,297,633 (Jan. 10, 1967); 3,297,636 (Jan. 10. 1967); 3,317,464 (May 2, 1967); 3,351,611 (Nov. 7, 1967); 3,351,624(Nov. 7, 1967); 3,398,20 (Aug. 20, 1968); 3,448,077 (June 3, 1979); 3,449,295 (June 10, 1969); 3,471,441 (Oct. 7, 1969); 3,498,950 (Mar. 3, 1970); 3,505,289 (Apr. 7, 1970); 4,049,629 (Sept. 20, 1977); 4,051,106 (Sept. 27, 1977); 4,051,107 (Sept. 27, 1977); 4,079,034 (Mar. 14, 1978); 4,126,602 (Nov. 21, 1978); 4,137,278 (Jan. 30, 1979); 4,187,259 (Feb. 5, 1980); 4,211,687 (July 8, 1980); 4,221,694 (Sept. 9, 1980); 4,251,429 (Feb. 17, 1981); 4,255,555 (Mar. 10, 1981); 4,256,625 (Mar. 17, 1981); 4,278,785 (July 14, 1981); 4,283,523 (Aug. 11, 1981); 4,284,549 (Aug. 18, 1981); 4,304,709 (Dec. 8, 1981); 4,305,862 (Dec. 15, 1981); 4,312,975 (Jan. 26, 1982); 4,319,017 (Mar. 9, 1982); 4,327,012 (Apr. 27, 1982).

The aromatic acids which may be utilized to provide aromatic polyesters typically are dicarboxylic acids in which each carboxy group is attached to a carbon atom in an isolated or fused aromatic ring.

Representative examples of aromatic acids include terephthalic acid, isophthalic acid, diphenyl-4,4'-dicarboxylic acid, naphthalene-2,6-dicarboxylic acid, naphthalene-2,7-dicarboxylic acid, naphthalene-1,4-dicarboxylic acid, naphthalene-1,5-dicarboxylic acid, diphenylether,4,4'-dicarboxylic aid, diphenyl-sulfone-4,4'-dicarboxylic acid, diphenylmethane-4,4'-dicarboxylic acid and diphenoxyethane-4,4'-dicarboxylic acid, as well as the ester forming derivatives thereof.

The aromatic diols which may be used to produce the aromatic polyesters typically are diols in which the hydroxy group is attached to a carbon atom in an isolated or fused aromatic ring.

Representative examples of suitable aromatic diols include hydroquinone, resorcinol, 1,4-naphthalenediol, catechol, 4,4'-isopropylidenediphenol (also known as bisphenol A) or its structure analogs, 4,4'-sulfonyldiphenol, 4,4'-thiodiphenol, 4,4'-oxydiphenol, 4,4'-dihydroxybiphenyl, 4,4'-sulfonylbis(2,6-dibromophenol), 4,4'-(2-norbornylidene)diphenol, 2,6-naphthalenediol, 4,4'-isopropylidenebis (2,6-dichlorophenol).

Such aromatic polyesters may also have incorporated therein aromatic hydroxy acids such as p-hydroxybenzoic acid, m-hydroxybenzoic acid and the various naphthalenehydroxy-carboxylic acids.

The polyarylates are a series of engineering thermoplastics. One class of polyarylates is available from Celanese Corporation under the tradename of Durel and from Union Carbide Corporation under the tradename of Ardel. Information about the Durel and Ardel polyarylates are available in brochures from the respective manufacturers. For relatively inexpensive polymers, they have reasonable physical properties (e.g., thermal resistance, impact strength, etc.) and good processability. They have generally good resistance to chemicals with the exception of chlorinated solvents, ethylene glycol antifreeze, brake fluid, and N,N-dimethylformamide, and inorganic acids (e.g., HCl), among others. However, the utility of the polyarylates is severely limited in the aerospace industry, where resistance to paint strippers such as methylene chloride is required. The poor hydrolytic stability also limits its use in specific applications.

Aromatic polybenzimidazoles are characterized by a high degree of thermal and chemical stability. They may be shaped to form fibers, films, and other articles of wide utility which show resistance to degradation by heat, hydrolytic media and oxidizing media. However, many of the polybenzimidazoles are not easily thermally processable at desirably low enough temperatures and pressures.

Aromatic polybenzimidazole (PBI) available from Celanese Corporation has the following unit formula:

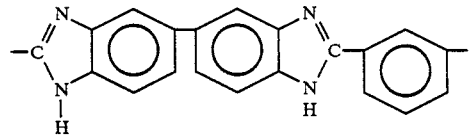

The PBI has excellent heat and chemical resistance. Unfortunately, the aromatic polybenzimidazoles have relatively high moisture regain, which, although desirable for textile fibers, is undesirable for engineering plastics. In addition, they are rather expensive polymers.

Processes for the preparation of aromatic polybenzimidazoles are described in a number of U.S. Pat. Nos., e.g., 3,901,855; 4,002,679; 3,433,772; 3,441,640;

3,509,108; 3,526,693; 3,549,603; 3,552,389; 3,619,453; 3,671,491; 3,969,430; and 4,020,142. In addition, a review of the processes for the preparation of aromatic polybenzimidazoles is contained in J. P. Critchley, G. J. Knight and W. W. Wright, Heat-Resistant Polymers-Technologically Useful Materials, Plenum Press, New York (1983), 259–322. This reference makes the point that despite considerable research effort, polybenzimidazoles have not been commercially successful except as fibers and fabrics. On page 259, it states that polybenzimidazoles "have not been very substantial competitors" to the polyimides.

Unduly broad but unenabling suggestions about blending polymers exist in the literature, e.g., U.S. Pat. No. 4,302,413. However, most pairs of polymers tend to be totally immiscible [Fred W. Billmeyer, Jr., Textbook of Polymer Science, Wiley-Interscience, New York (1984), 176]. It is therefore surprising that the compositions of the present invention are miscible and also surprising that there are synergistic ameliorative effects of one polymer on the other's weak properties, as detailed below.

SUMMARY OF THE INVENTION

Despite the fact that most pairs of polymers tend to be immiscible, we have discovered unexpectedly that polyarylates and aromatic polybenzimidazoles are miscible in all proportions.

Briefly, the invention comprises a novel composition comprising from about 5 parts by weight to about 95 parts by weight of a polyarylate and from about 95 parts by weight to about 5 parts by weight of an aromatic polybenzimidazole. Most preferably, the composition comprises at least about 10 to 30 parts by weight of an aromatic polybenzimidazole or a polyarylate.

The miscible compositions of the invention may be prepared by a process which comprises dissolving an aromatic polybenzimidazole and a polyarylate in a mutual solvent in relative weight proportions to each other of from about 5 to about 95 of the aromatic polybenzimidazole to about 95 to about 5 of the polyarylate and then using the solution to form products (e.g., films or fibers) or adding the solution to a non-solvent to precipitate the novel composition and subsequently drying the composition.

The compositions, particularly in the form of films, fibers or fibrets, may be post-treated with heat or sulfuric acid in order to minimize their shrinkage when subsequently subjected to heat and in order to increase their stabilities to solvents and acid.

The novel compositions of this invention have unexpected properties and benefits. The compositions are useful under severe environmental conditions. The compositions have good thermal resistance, solvent resistance, improved physical properties and good price/performance characteristics. Although aromatic polybenzimidazoles generally have high thermal stability and good solvent resistance, they are expensive polymers with high moisture regain. Polyarylates generally have relatively low glass transition temperatures and lack resistance to certain solvents, but they are tractable polymers and are much less expensive than aromatic polybenzimidazoles.

Therefore, it is an object of this invention to provide compositions of aromatic polybenzimidazoles and polyarylates, which are less expensive than aromatic polybenzimidazoles and which have higher thermal stability and better solvent resistance than polyarylates with better price/performance characteristics.

It is a further object of this invention to provide compositions of aromatic polybenzimidazoles and polyarylates which are useful in molding, fiber or film forming processes and in applications where the polybenzimidazoles themselves were either not useful or not as useful.

DESCRIPTION OF THE PREFERRED EMBODIMENTS

Figure 1:
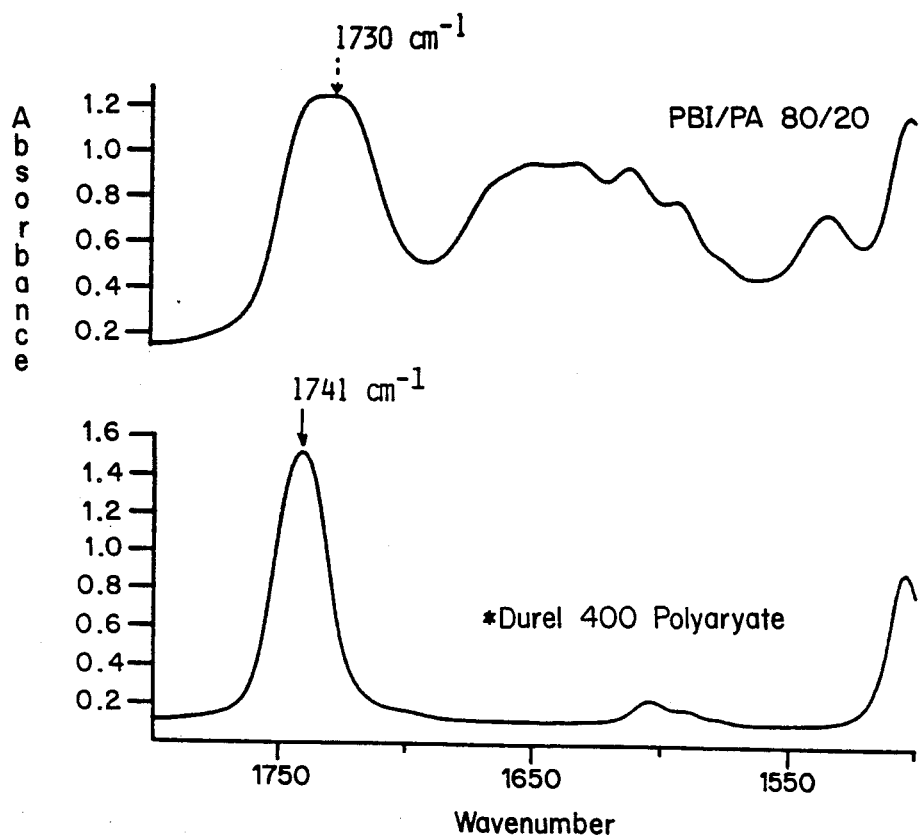
FIG. 1 shows that Fourier Transform IR analyses confirmed intermolecular hydrogen bonding of a polybenzimidazole/polyarylate (PBI/PA) blend. Due to the hydrogen bonding, the carbonyl group of the PA shifted from 1741 to 1730 cm$^{-1}$.

Generally, the polyarylate used in the invention has the following unit formula:

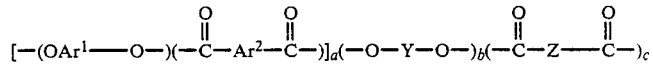

wherein Ar$^1$ and Ar$^2$ represent divalent aromatic moieties or mixtures thereof; wherein Y represents a divalent aliphatic moiety containing up to 6 carbon atoms, or mixtures thereof; wherein Z represents a divalent aliphatic moiety containing up to 6 carbon atoms, or mixtures thereof; and wherein a has a value of greater than 0.5 to 1, b has 0 or a value less than 0.5, and c has a value of 0 or a value less than 0.5, the sum of a, b and c being equal to 1.

Although other classes of polyarylates may be used in the compositions of this invention, preferred polyarylates which may be used in the compositions and processes of this invention have repeating units of the following formula

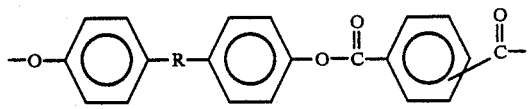

wherein R in the bisphenol moiety represents —C(CH₃)₂— or —SO₂— or —O—. The phthalate moiety may be from isophthalic acid, terephthalic acid or a mixture of the two at any ratio (i.e., ranging from 99% isophthalic acid and 1% terephthalic acid to 1% isophthalic acid and 99% terephthalic acid.

The polyarylates from Celanese Corporation (Durel®) and Union Carbide (Ardel®) are most preferred. Durel® is an amorphous homopolymer with a weight average molecular weight of about 20,000 to 200,000. Different polyarylates may be blended in the compositions of the invention.

The polyarylates are soluble in halogenated or polar solvents. For example, both the Durel® and Ardel® polyarylates dissolved readily in methylene chloride, chloroform, N-methylpyrrolidinone, N,N-dimethylformamide and N,N-dimethylacetamide. However, heating at 100° C. for ½ hour was required for dissolving concentrated polyarylate (≧10%) in N-methylpyrrolidinone in order to obtain a clear solution.

Although any aromatic polybenzimidazole described in the prior art may be used, the preferred aromatic polybenzimidazoles employed as starting materials to prepare the novel compositions of the present invention are those having the repeating unit formula:

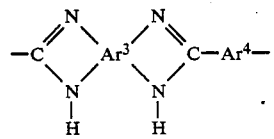

wherein >Ar³< represents a tetravalent aromatic moiety having the formula

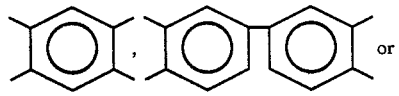

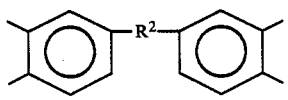

Wherein R² is —O—, —SO₂—, or —CH2—$_x$ and x is a positive integer; and —Ar⁴— represents a divalent aromatic moiety having the formula

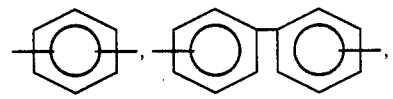

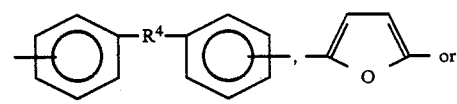

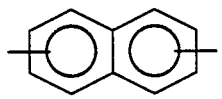

wherein R⁴ is —O—, —CH2—$_x$ or —Si(CH₃)₂—O—Si(CH₃)₂ and x is a positive integer.

Examples of the more preferred aromatic polybenzimidazoles which may be used in the compositions of the present invention include:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1", 6")-5,5'-bibenzimidazole;
poly-2,2'-(biphenylene 4",4")-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone,
poly-2,2'-(m-phenylene)-5,5'-di(benzimidazole)methane;
poly-2,2'-(m-phenylene)-5,5" di(benzimidazole)-propane-2,2; and
poly-2,2"-(m-phenylene)-5,5" di(benzimidazole)-ethylene-1,2 where the double bonds of the ethylene groups are intact in the final polymer. Poly-2,2'-(m-phenylene)-5,5'-bibenzimidazole, which contains recurring units of the formula:

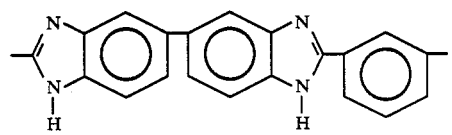

is most preferred. Aromatic polybenzimidazoles of this type are commercially available from Celanese Corporation. These polybenzimidazoles are preferred components of the compositions because they are relatively more thermally stable and more soluble in N,N-dimethylacetamide than other polybenzimidazoles. This desirable combination of thermal stability and solubility makes them relatively processable. In addition, they have higher molecular weights than other polybenzimidazoles.

The novel compositions comprise from about 5 parts by weight to about 95 parts by weight of a polyarylate and from about 95 parts by weight to about 5 parts by weight of an aromatic polybenzimidazole. The more preferred compositions are those which are comprised of about 20 to about 50% of either the aromatic polybenzimidazole or the polyarylate.

If a composition of the invention is mostly comprised of aromatic polybenzimidazole, it is preferred that the minor amount of polyarylate in the composition be sufficient to make the aromatic polybenzimidazole more tractable and processable and also less susceptible to moisture. It is thought that the minor amount of the polyarylate accomplishes the amelioration of the processability of the aromatic polybenzimidazole by interacting with and/or plasticizing the aromatic polybenzimidazole. More preferably, the compositions are comprised of from about 50 parts by weight to about 95 parts by weight of an aromatic polybenzimidazole and from about 50 parts by weight to about 5 parts by weight of a polyarylate. Most preferably, the composition comprises at least about 10 parts by weight of a polyarylate. It is surprising that a minor amount of the polyarylate can ameliorate the weak properties of the polybenzimidazole, i.e., poor thermal plasticity and moisture regain. At the same time the less expensive polyarylate decreases the cost of the composition substantially below the cost of the polybenzimidazole.

If a composition of the invention is mostly comprised of polyarylate, it is preferred that the minor amount of aromatic polybenzimidazole in the composition be sufficient to render the polyarylate less sensitive to solvents, particularly chlorinated hydrocarbons. Preferably, the aromatic polybenzimidazole is present in an amount sufficient to result in a composition with greatly reduced solubility and low swelling, i.e., minimal weight loss in the composition of the invention when it is immersed in a chlorinated hydrocarbon for a period of time which would ordinarily result in the dissolving of a similar object made from the polyarylate itself. More preferably, the compositions are comprised of from about 60 parts by weight to about 95 parts by weight of a polyarylate and from about 40 parts by weight to about 5 parts by weight of an aromatic polybenzimidazole. Most preferably, based on preliminary tests, the composition should contain at least about 20 to about 30 parts by weight of a polybenzimidazole in order to impart to the polyarylate component greatly enhanced solvent-resistance in chlorinated solvents. In addition to improving solvent resistance, aromatic polybenzimidazole in the composition substantially increases the thermal stability and physical properties of the composition, giving excellent price-performance results. At the current time, aromatic polybenzimidazoles are on the order of twenty times the price of polyarylates. Polyarylates are commercially successful because of their generally good combination of properties, with the exception, of course, of poor resistance to chlorinated solvents in some applications. Those properties can be substantially improved in accordance with this invention by incorporating a minor amount of a relatively more expensive aromatic polybenzimidazole in a miscible blend with the polyarylate. It appears that all the beneficial properties of the polyarylates may be retained and solvent resistance, thermal and physical properties may be improved at a moderate additional cost. It is surprising that a minor amount of the polybenzimidazole can ameliorate the relatively weak properties of the polyarylate, i.e., poor resistance to chlorinated solvents and low thermal stability and physical properties (tenacity and modulus). At the same time, the less expensive polyarylate decreases the cost of the composition substantially below the cost of the polybenzimidazole.

In order to prepare miscible compositions of the invention, the aromatic polybenzimidazoles and polyarylates may be first dissolved in a mutual solvent, e.g., N,N-dimethylformamide (DMF), N,N-dimethylacetamide (DMAc), dimethylsulfoxide (DMSO), or N-methylpyrrolidinone (NMP) or concentrated $H_2SO_4$, so that each polymer is present in the resulting solution at the desired concentration up to the total polymer concentration of, e.g., from about 1% to about 25% on a weight/volume basis, preferably from about 15 to 20%. It is preferred that the total concentration of the two polymers in the solution be such that the viscosity of the solution is acceptable for subsequent processing. The two polymers may be simultaneously dissolved in the solvent, or each polymer may be separately dissolved in separate volumes of solvent and desired portions of the resulting solutions can be mixed together to form a solution of the two polymers.

Then the solution may be added to a non-solvent such as an alcohol containing from 1 to 4 carbon atoms, e.g., methanol, to precipitate a novel composition of this invention with the desired concentration of component polymers. Subsequently, the precipitated composition is washed with, e.g., methanol or water, to remove residual solvent if it is present and then, e.g., vacuum-dried at moderate temperatures. If films or fibers of the solution of the composition are cast or extruded, the solvent should be evaporated at low relative humidity, e.g., in a dry nitrogen atmosphere, and moderate temperatures, e.g., at about $\geq 140°$ C. After a substantial portion of the solvent is removed (e.g., about 85%), the remaining solvent may be removed by washing the film or fibers with hot water. Whether the solution of the composition is cast, extruded or precipitated, moisture should be initially excluded until most of the solvent is removed.

The two components of the compositions of the invention are miscible, or compatible. Several criteria indicate blend compatibility or miscibility. They are:

(a) Clearness of the film (by visual analysis aided by microscopic examination, if necessary);

(b) Thermal Gravimetric Analysis indicates that the blend follows the rule of mixtures;

(c) Residual NMP follows the rule of mixtures;

(d) Fourier Transform Infrared analysis indicates intermolecular hydrogen-bonding; and (e) X-Ray Diffraction analysis confirms that PBI and PA interact and are compatible on a molecular scale.

The downfield shifting of the carbonyl band is a well known phenomenon for hydrogen bonding of the carbonyl group. FIG. 1 shows the Fourier Transform IR observed intermolecular Hydrogen bonding of a PBI/PA blend. Due to the Hydrogen bonding, the carbonyl group of the PA shifted from 1741 to 1730 $cm^{-1}$. Therefore, the hydrogen bonding between the imidazole hydrogen of the PBI and the carbonyl group of the PA is confirmed.

Figure 2:
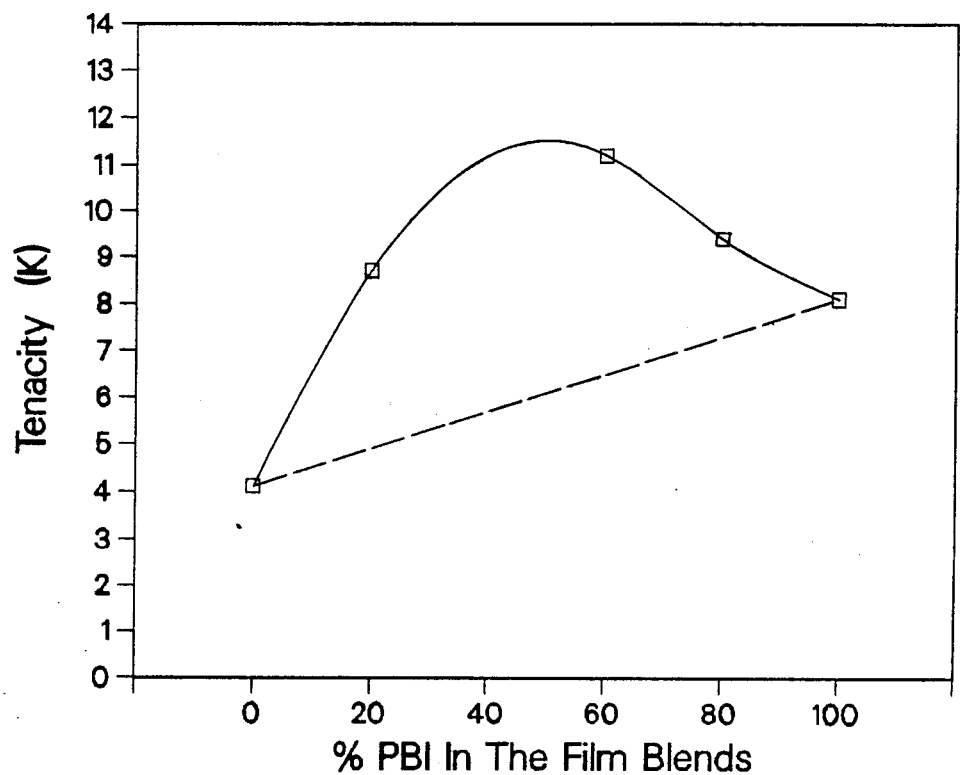
FIG. 2 shows that the tenacity of several PBI/PA films exceeds the tenacity predicted by the rule of mixtures.

Most of the known blends have physical properties following the rule of mixtures or below the rule of mixtures. FIG. 2 shows that the tenacity of several PBI/PA films exceeds the rule of mixtures values, which indicates the surprising synergistic effect obtained by blending PBI and PA.

Figure 3:
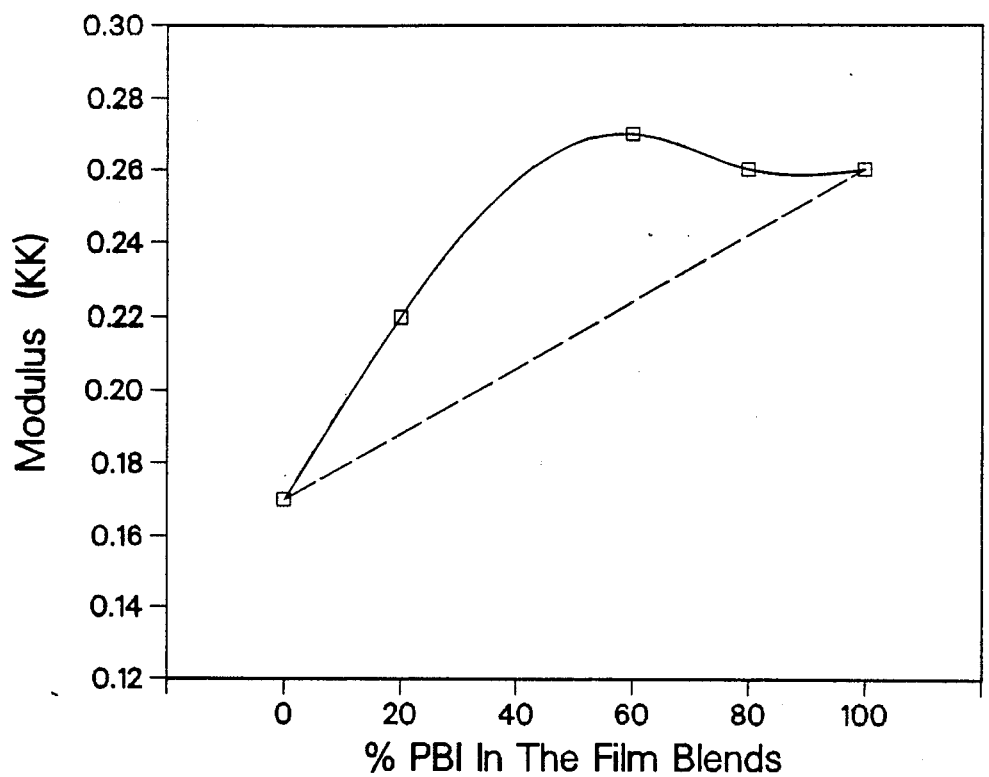
FIG. 3 shows that the modulus of PBI/PA films exceeds the modulus predicted by the rule of mixtures.

Again, FIG. 3 shows that the modulus of PBI/PA films exceeds the modulus predicted by the rule of mixtures, which further indicates the surprising synergistic effect obtained by blending PBI and PA.

Figure 4A:
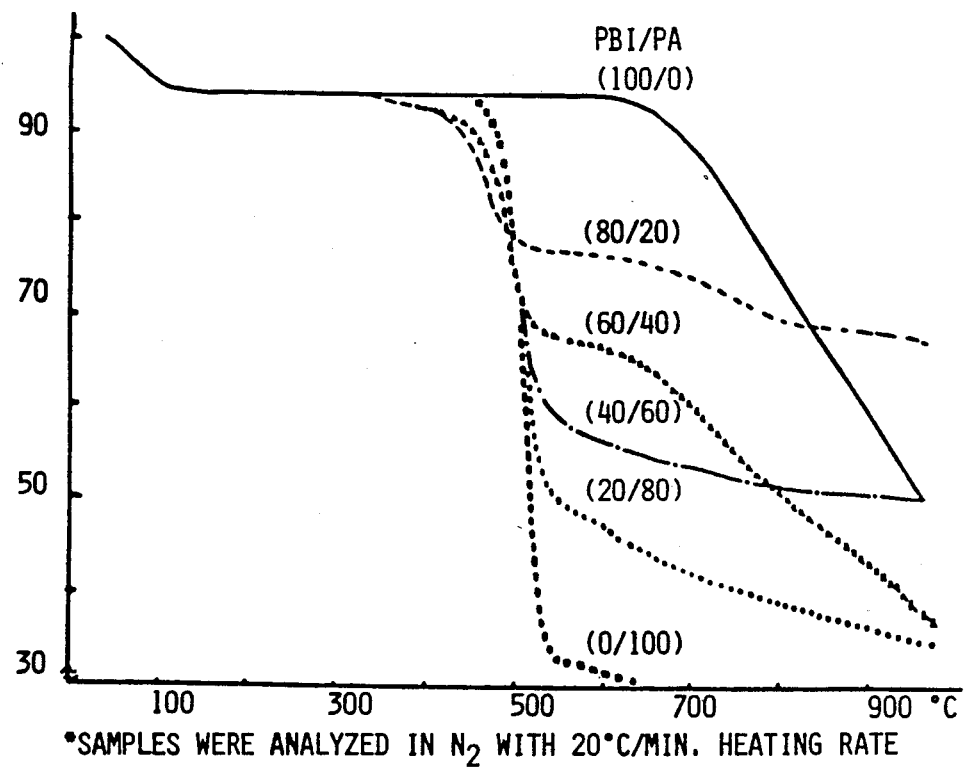
FIG. 4A shows the Thermal Gravimetric Analysis curves of several PBI/PA films and FIG. 4B shows the Isothermal Thermal Gravimetric Analysis curves of several PBI/PA films.

FIG. 4A shows the results of Thermal Gravimetric Analysis of PBI/PA films, indicating the significant thermal property improvement for PA obtained by blending it with PBI.

Figure 4B:
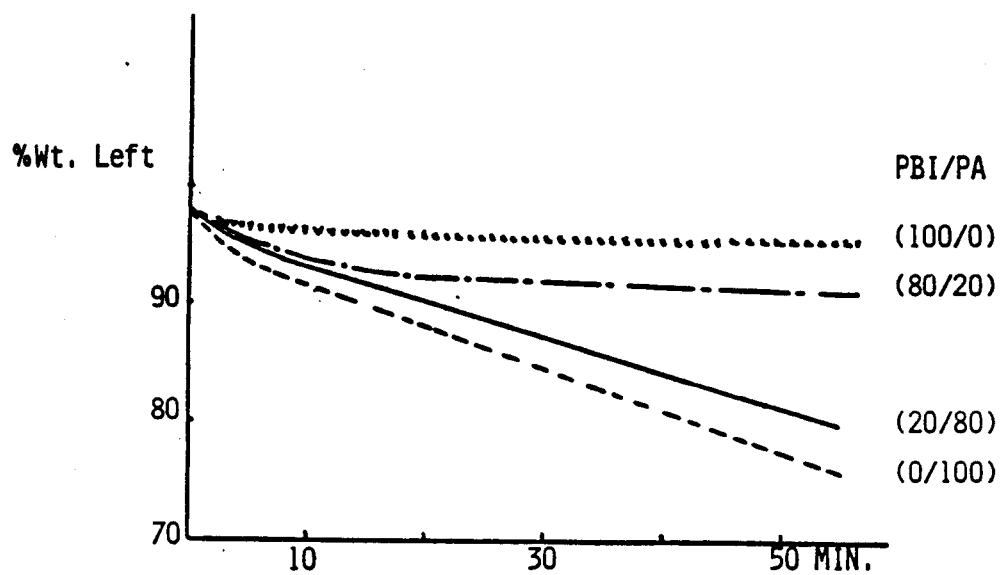

FIG. 4B shows how PBI increases the thermal properties of PA in an isothermal condition.

Figure 5:
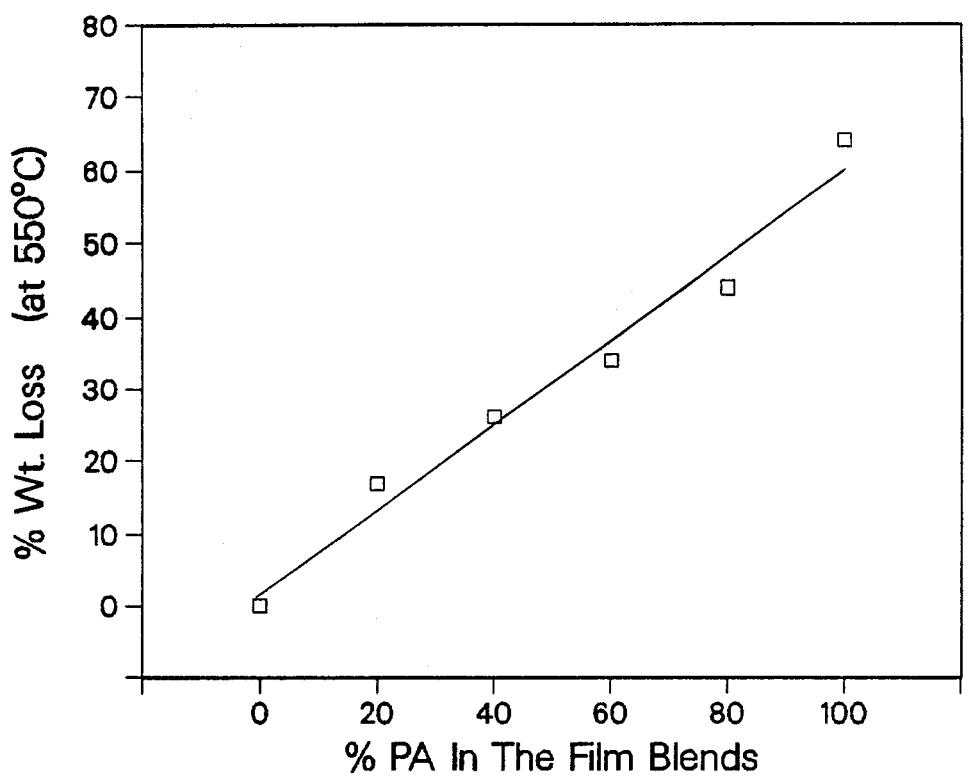
FIG. 5 shows that the thermal stability (at 550° C.) of the blend increases as the relative PBI concentration increases.

FIG. 5 shows that the thermal stability (at 550° C.) of the blend increases proportionately as the relative PBI concentration increases.

Figure 6:
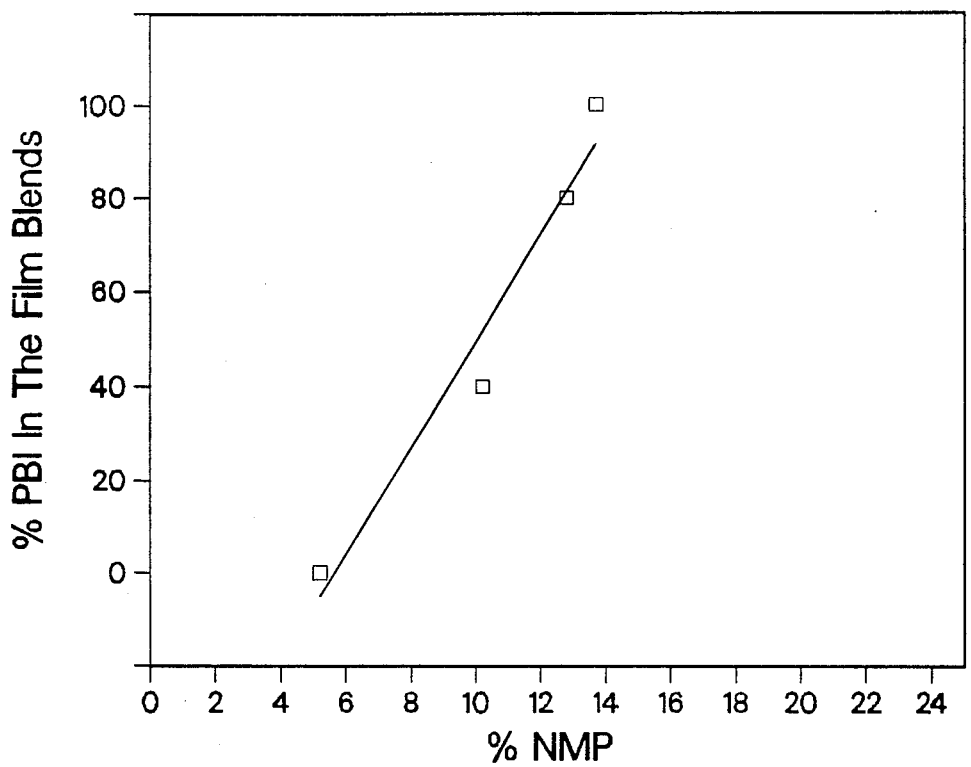
FIG. 6 shows that the hydrophilicity (or residual N-methylpyrrolidinone) of the blend follows the rule of mixtures.

PBI is hydrophilic and has a high moisture and solvent regain. After blending with PA, the hydrophilicity of the PBI dramatically decreased. FIG. 6 indicates that the hydrophilicity (or residual NMP) of the blend follows the rule of mixtures.

Another process for preparing moldable compositions comprises grinding together an aromatic polybenzimidazole and a polyarylate in relative weight proportions to each other of from about 5 to about 95 of the aromatic polybenzimidazole to about 95 to about 5 of the polyarylate until the diameters of the solid particulates reach 100 um or less. For example, a solid PBI/PA (70/30) blend may be prepared by mechanically grinding a mixture of PBI and PA polymers. A freeze mill device may be used for grinding, and the grinding process continued until the diameters of the solid particulates reach 37 um or less (which can take about 40 minutes). Those fine solid blends have a uniform visual appearance and are compressively moldable ($\geqq 5000$ psi, 30 minutes at 410° C.). The molded product has a dark color, is rigid and exhibits good physical integrity.

Although the compositions of the invention are miscible in all proportions and are useful as such, useful phase-separated systems may be formed, for example, by changing parameters, such as moisture content during solvent removal. The composition and properties of phase-separated systems can be controlled and varied according to the specific properties required, using pressure, temperature, time at the phase-separation conditions, initial composition as variables, etc. Obviously, innumerable combinations of these parameters can be employed to produce a wide assortment of potentially useful phase-separated systems.

Phase-separated systems have property synergisms when used at a temperature above the glass transition temperature of the aromatic polyarylate component of the composition. It is possible to obtain phase-separated compositions where the matrix polymer is either the aromatic polybenzimidazole or the polyarylate and the dispersed phase is the other polymer. This depends on which polymer is the preponderant component and/or the technique employed to cause the phase separation. If the aromatic polybenzimidazole is the matrix polymer of the phase-separated composition, the polyarylate is the dispersed phase and the composition is used above the glass transition of the polyarylate, then the composition is an impact-resistant plastic. If, however, the aromatic polyarylate is the matrix polymer of the phase-separated composition, the aromatic polybenzimidazole is the dispersed phase and the composition is used above the glass transition of the aromatic polyarylate, then the composition is a reinforced rubber.

The compositions, particularly in the form of films, fibers or fibrets, may be post-treated with heat or sulfuric acid in order to minimize their shrinkage when subsequently subjected to heat and in order to increase their resistance to solvents, such as DMAc and NMP, and acids, such as concentrated inorganic acids, such as hydrochloric acid. After post-treatment, the compositions are no longer soluble in the solvents used to initially form the blends of the constituent polymers, e.g., DMAc or NMP. Heating in air or in an inert atmosphere at a temperature of from about 200° to about 500° C. for a period of time of from about 1 to about 30 minutes may be employed. The time-temperature relationship to obtain the required results can be determined empirically. Preferably, heating at a temperature of from about 350° to about 400° C. may be used. Alternatively, the product may be posttreated by treating with a sulfonating agent followed by heat setting at temperature of from about 200° to about 500° C. for a period of time sufficient to minimize its shrinkage when subsequently subjected to heat and to increase its resistance to solvents and acids. A solution of from 1 to about 15% sulfonating agent followed by heat setting at temperature of from about 200° to about 500° C. may be used. The sulfonating agent may be sulfuric acid, sulfur trioxide, toluene sulfonic acid or naphthalene sulfonic acid. Preferably, post-treatment is accomplished by dipping the product in 5% sulfuric acid followed by heat setting at a temperature of from about 350° to about 400° C. for a period of time sufficient to minimize its shrinkage when subsequently subjected to heat and to increase its resistance to solvents and acid.

The following examples describe the manner and process of making and using the invention and set forth the best mode contemplated by the inventors for carrying out the invention, but are not to be construed as limiting.

In the following examples, the preferred aromatic polybenzimidazole polymer is used, namely, poly-2,2'-(m-phenylene)-5,5'-bibenzimidazole.

EXAMPLE 1

Celanese polybenzimidazole having an inherent viscosity of 0.4 (6 gm) or greater was mixed with 50 mls of N-methylpyrrolidinone at 180° C. for 120 minutes. Then the resulting mixture was filtered through glass wool. The filtrate containing about 12% polybenzimidazole was used as a solvent to dissolve 1.5 gm of Union Carbide's Ardel ® polyarylate (120° C., 30 minutes). The solution contained about 12% polybenzimidazole and 3% polyarylate (PA) in N-methylpyrrolidinone (NMP). The solution was kept at 80° C. overnight. The solution (A) was found clear (no precipitate). The solids content of the solution was about 15%. A clear yellow film was cast from solution A on a glass plate. The casting was repeated. Visual and microscopic observation indicated that the thin film was clear.

Example 2

Dissolution techniques were developed to assess the compatibility and processability of blends containing polybenzimidazole and polyarylate. Using N-methylpyrrolidinone, dopes containing high levels ($\geqq 20\%$, wt./vol.%) of solids with the following polybenzimidazole/polyarylate compositions ratios were prepared: 100/0, 80/20, 60/40, 20/80 and 0/100. These dopes were homogeneous and had no insolubles. Also, the stability of these dopes increased with the increase of the relative concentration of polyarylate. Clear films were successfully cast by using the above polybenzimidazole/polyarylate blends. FT-IR analyses suggested that there is a molecular synergism (i.e., intermolecular H-bonding) between polyarylate and polybenzimidazole.

Six 20% (wt./vol.%) solutions having the following PA/Polybenzimidazole compositions were prepared using a dissolving technique described below: 100/0, 80/20, 60/40, 40/60, 20/80 and 0/100. For the sake of simplicity, as-spun Celanese polybenzimidazole was used for the dissolving studies, and the NMP solvent contained no salt, such as LiCl, for stability. The PA was standard Ardel ® from Union Carbide Corporation. The dissolving was accomplished by weighing and drying (100° C., 20 min.) 20 gm samples of each polymer composition, then adding each sample to a separate refluxing flask containing 100 mls of NMP. The NMP was kept at 100° C., and the whole sample (20 gm) was added in 2 gm portions over a period of 1 hour. After complete addition, the six solutions were heated at 100°

C.. under constant stirring for another hour before cooling to room temperature.

No insolubles could be visually observed in any of these six solutions during the first 12 hours. After aging at room temperature for 1 day, the solution containing 100% Polybenzimidazole and 80/20 polybenzimidazole/PA formed brown precipitates which could be readily dissolved upon heating. The other solutions were more stable and the dope stability, based on haze level, appeared to increase with the increase of the relative PA concentration. In a separate film casting trial, clear films could be cast from all of the above PA/polybenzimidazole dopes.

Those results suggested not only that high levels ($\geq 20\%$ solids) of PA and polybenzimidazole could be co-dissolved into NMP, but also that molecular interaction might exist between PA and Polybenzimidazole, causing a synergistic effect on properties.

Film samples from the six solutions were cast on a glass plate. Each fresh, wet film was dried for 20 minutes in a laboratory vacuum oven set at 140° C., then cooled to room temperature for 20 minutes, and finally soaked in a water bath for 20 minutes. The samples were evaluated for mechanical properties. The samples appear to have mechanical properties which exceed the rule of mixtures for both the tenacity and the modulus.

The results of the experiments conducted are tabulated in the following Tables:

Table 1 describes the development of a cosolvent for preparing stable and processable dopes containing PBI and PA.

Table 2 shows the results of the compatibility studies of the PBI/PA blends.

Table 3 describes the physical property improvements obtained by blending PBI with PA.

Table 4 indicates that the stability to solvents (e.g., methylene chloride or tetrachloroethane) of PA is dramatically improved by blending it with PBI.

TABLE 1

| Cosolvent (NMP) Development | | | | | | |
|---|---|---|---|---|---|---|
| | PBI/PA Ratio (wt./wt.) | | | | | |
| | 100/0 | 80/20 | 60/40 | 40/60 | 20/80 | 0/100 |
| Dope homogeneity | Yes | Yes | Yes | Yes | Yes | Yes |
| Dope Stability (days) | 1 | 1 | 3 | 5 | 7 | >14 |

Note:
(1) PBI (as-spun fiber) having <1 PPM residual LiCl and <0.3% residual DMAc was used for preparing all dopes.
(2) The solids content of all dopes was 20% (wt %) and no LiCl was added.
(3) All dopes were prepared by heating the polymer in NMP at 100° C. for two hours.
(4) PA is Union Carbide Ardel ® (D-100).
(5) Dope homogeneity and stability were based on visual measurements of the haze level and insolubles.

TABLE 2

| Compatibility Studies of the PBI/PA Blends | | | | | | |
|---|---|---|---|---|---|---|
| PBI/PA ratio | 100/0 | 80/20 | 60/40 | 40/60 | 20/80 | 0/100 |
| Cast film | Clear | Clear | Clear | Clear | Clear | Clear |
| H-bonding | No | Yes | Yes | NM | NM | No |

Note:
(1) 2 mil films were prepared by drying the wet film (cast on a glass plate) in a laboratory vacuum oven at 140° C. for 20 minutes.
(2) Intermolecular hydrogen-bonding of the blend samples was determined by using IR. The carbonyl band of PA showed downfield shifting (i.e. from 1741 to 1730 cm$^{-1}$) caused by bonding to the imidazole hydrogen of PBI. "NM" means not measurable because the carbonyl background of PA is too high to show any imidazole-induced shifting.

TABLE 3

| Tenacity and Modulus of PBI/PA Films | | |
|---|---|---|
| PBI/PA (wt./wt.) | Tenacity (K) | Modulus (KK) |
| 100/0 | 8.1 | 0.26 |
| 80/20 | 9.4 | 0.26 |
| 60/40 | 11.2 | 0.27 |
| 20/80 | 8.7 | 0.22 |
| 0/100 | 4.1 | 0.17 |

Note:
1. PA (Ardel ® D-100)
2. PBI (As spun fiber)
3. All data are the average of three individual analyses.
4 Tenacity (K); K = $10^3$ PSI. Modulus (KK); KK = $10^6$ PSI.

TABLE 4

| Improved Solvent Stability of PBI/PA Films | | | | | | |
|---|---|---|---|---|---|---|
| PBI/PA ratio | 100/0 | 80/20 | 60/40 | 40/60 | 20/80 | 0/100 |
| $CH_2Cl_2$ (25° C., 30 min) | I | I | I | I | FI | S |
| TCE (100° C. 10 min.) | I | I | I | I | FI | S |
| Film Integrity | High | High | High | Good | Fair | No |

Note:
1. I—insoluble; S—Soluble; FI—Fairly insoluble
2. TCE is 1,1,2,2-tetrachloroethane Because the PBI/PA film blends have enhanced properties, such as good physical properties and improved solvent and thermal stability, the miscibility of PBI and PA was further investigated by using phase contrast microscopy and transmission electron microscopy. The morphology of cast films of the 80/20 and 60/40 PBI/PA blends as well as their cross-sections were evaluated using these microscopy techniques. Both techniques indicated no evidence of phase separation in those blends. The results further confirmed that the compatibility of PBI and PA existed on a molecular scale. In addition, the compatibility of films of PBI and PA blends was confirmed by X-Ray Diffraction Analysis.

Figure 7:
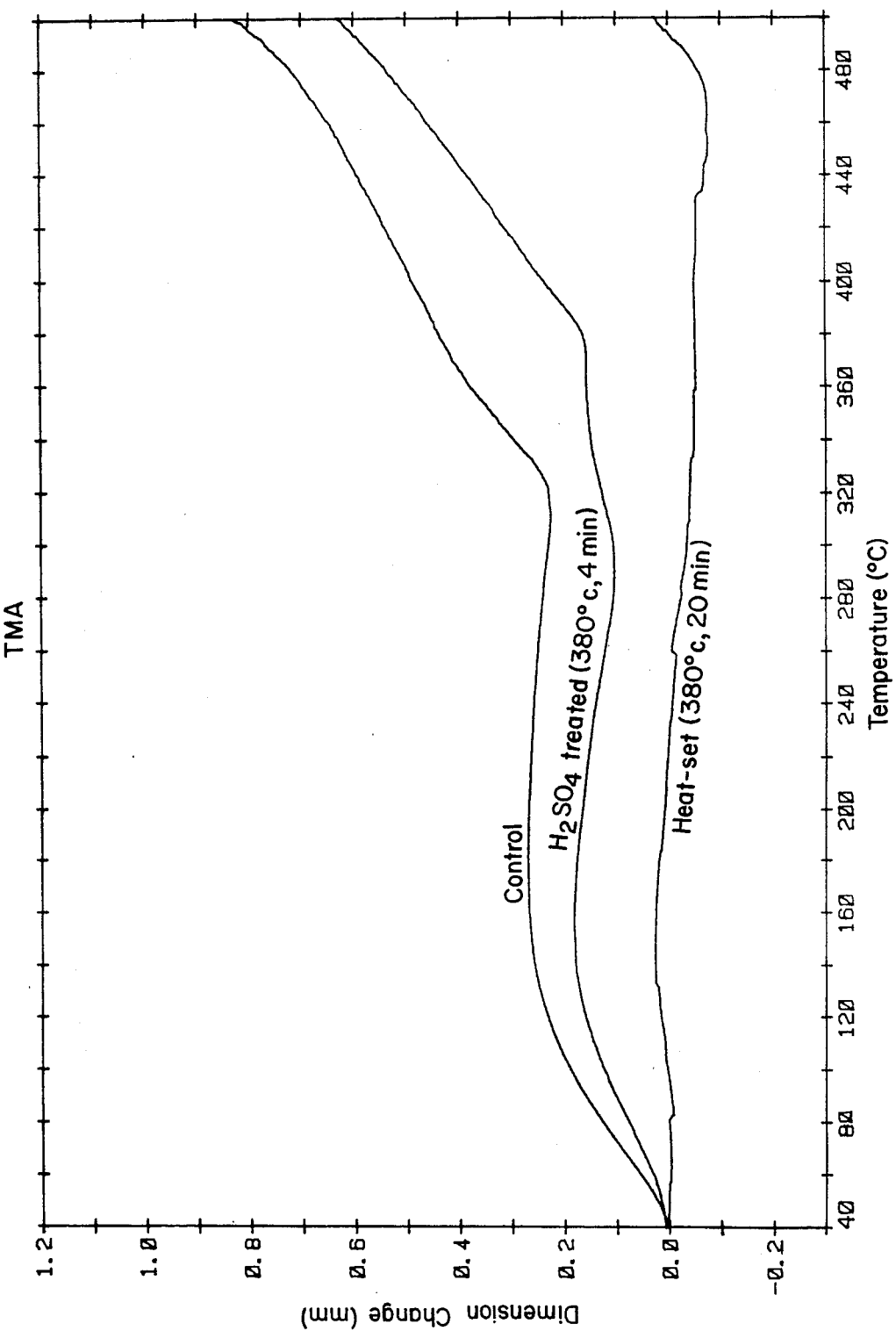
FIG. 7 shows the thermal shrinkage curves for post-treated PBI/PA (80/20) films using a Thermal Mechanical Analyzer. The films had been post-treated with sulfuric acid or with heat.

Based on the relative PBI concentration, the PBI/PA film blends exhibited excellent or improved resistance towards chlorinated hydrocarbons, but they are still soluble in polar solvents, such as NMP and DMAc. Those film samples also shrunk at an elevated temperature (e.g., >200° C.). Two post-treatment methods, thermal or sulfonation agent treatments, were developed for enhancing the solvent (NMP) stability and thermal shrinkage properties of the compatible PBI/PA blends. Initial results on an 80/20:PBI/PA film indicated the sample treated with either method (e.g., thermal treating at 380° C. for 20 minutes or 5% sulfuric acid dipping followed with 6 minutes 380° C. heat-setting) not only exhibited good physical integrity, but also showed improved solvent stability in NMP (100° C., 30 minutes) and concentrated sulfuric acid (25° C., 48 hours), a substantial improvement over the untreated films. Independent thermal analysis indicated these post-treatments would dramatically improve the thermal shrinkage properties of the original blend (see FIG. 7 and Table 5).

TABLE 5

| Post-Treatment of PBI/PA (80/20) Films | | |
|---|---|---|
| Treatment | Thermal Shrinkage (40 to 480° C. in air) | NMP Solubility (100° C., 30 minutes) |
| Control | 6.2% | Soluble |
| Sulfuric Acid | 4.7% | Insoluble |

TABLE 5-continued

Post-Treatment of PBI/PA (80/20) Films

| Treatment | Thermal Shrinkage (40 to 480° C. in air) | NMP Solubility (100° C., 30 minutes) |
|---|---|---|
| treated Thermally treated | 0.2% | Insoluble |

Note: Control samples were washed with hot water (80° C.) for 12 hours in order to remove residual NMP.

Figure 8:
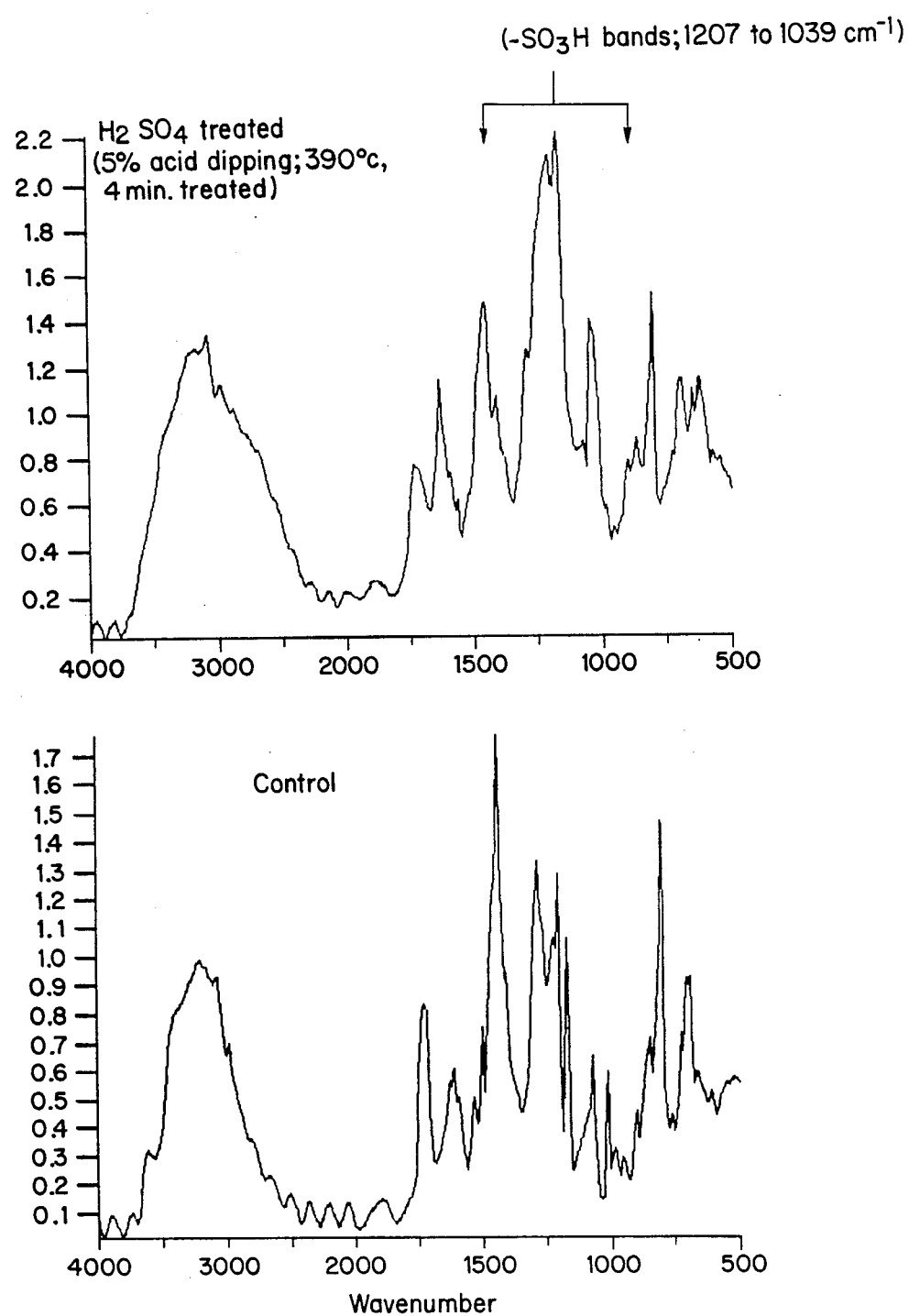
FIG. 8 shows the Fourier Transform IR sulfonation absorbance bands of a sulfuric acid post-treated PBI/PA blend.
Figure 9:
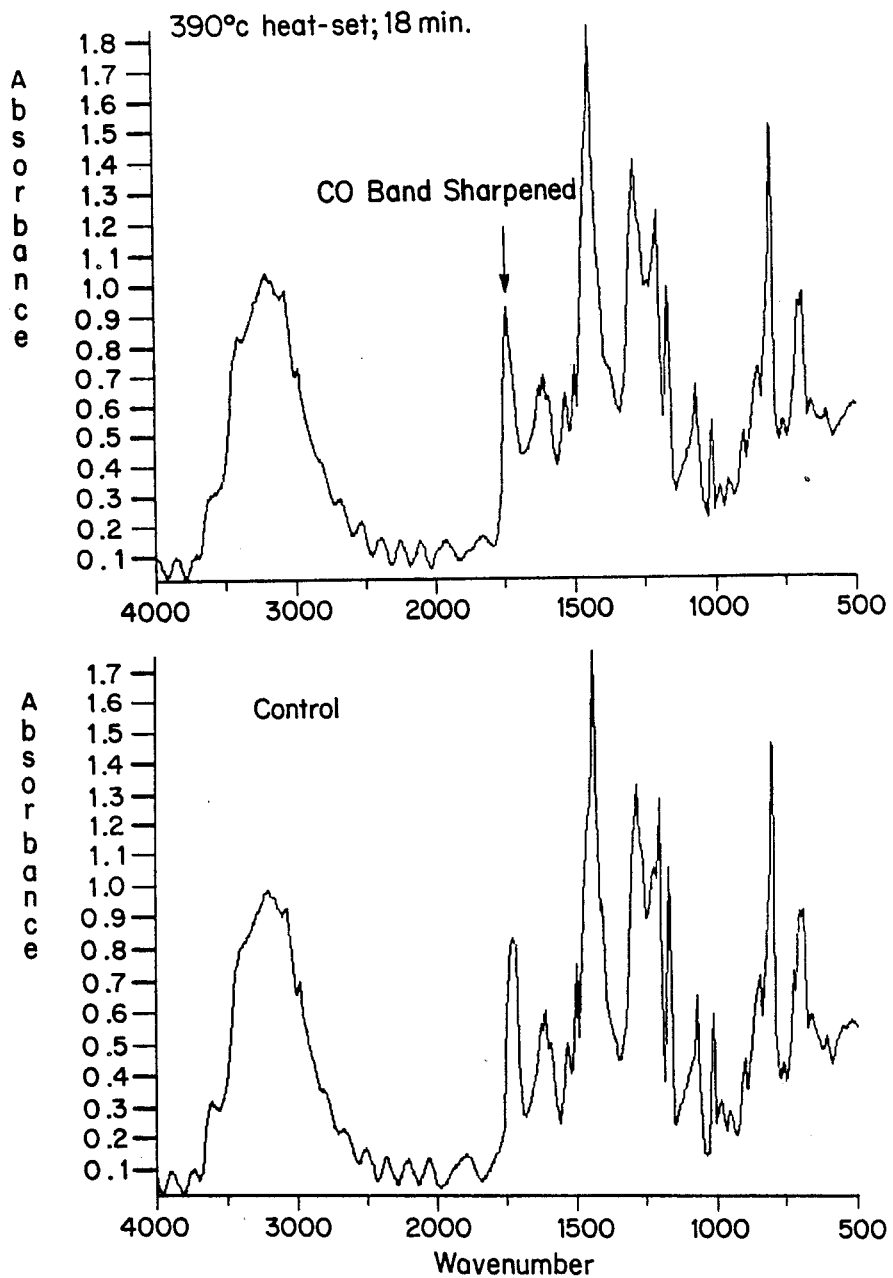
FIG. 9 shows the Fourier Transform IR absorbance of a control and a thermally post-treated PBI/PA blend.

Fourier Transform Infrared (FTIR) analytical studies suggested that the sulfuric acid treatment resulted in chemical sulfonation of the aromatic structure of the polymer components (see FIG. 8). For the high temperature thermally-treated blend, FT-IR analysis indicated that the improved chemical and thermal shrinkage resistance might be resulting from complex chemical reactions. First, the intermolecular hydrogen bonding between PBI and PA appeared to have been decreased relative to the untreated film because the carbonyl band of PA in the treated film was sharpened (see FIG. 9). Secondly, the PA and PBI might form some cross-linkages which were difficult to detect by FT-IR, but were sufficient enough to improve the chemical and shrinkage stability of the original film.

In order to explore the feasibility of enhancing the tractability of PBI and developing a meltable PBI/PA blend, the following two approaches were pursued.

First, NMP dopes containing 80/20 and 50/50 PBI/PA polymers were added to a non-solvent (e.g., methanol) with constant stirring in order to precipitate the component polymers. Subsequently, the precipitated composition was washed several times with aqueous methanol to remove residual solvent if it was present and then vacuum dried at 120° C. for 24 hours. After drying, the solid polymer blends were compressively moldable (≧5000 psi, 20 minutes at 350° C.) and homogeneous molded products could be obtained.

Secondly, a solid PBI/PA (70/30) blend was prepared by mechanically grinding a mixture of PBI and PA polymers. A freeze mill device was used for grinding and the grinding process continued until the diameters of the solid particulates reached 37 um or less (took about 40 minutes). The fine solid blend had a uniform visual appearance and were compressively moldable (≧5000 psi, 30 minutes at 410° C.). The molded product had a dark color, was rigid and exhibited good physical integrity.

What is claimed is:

1. A miscible composition comprising from about 5 parts by weight to about 95 parts by weight of a polyarylate and from about 95 parts by weight to about 5 parts by weight of a polybenzimidazole, total parts by weight of the polyarylate and polybenzimidazole equaling 100.

2. A composition as claimed in claim 1 in which the polyarylate has the following unit formula:

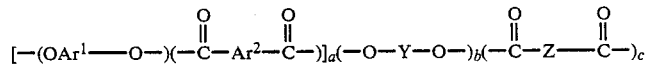

wherein $Ar^1$ and $Ar^2$ represent divalent aromatic moieties or mixtures thereof; wherein Y represents a divalent aliphatic moiety containing up to 6 carbon atoms, or mixtures thereof; wherein Z represents a divalent aliphatic moiety containing up to 6 carbon atoms, or mixtures thereof; and wherein a has a value of greater than 0.5 to 1, b is 0 or a value less than 0.5, and c has a value of 0 or a value less than 0.5, the sum of a, b and c being equal to 1; and the polybenzimidazole contains units of the formula:

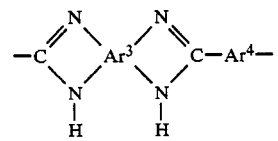

wherein $>Ar^3<$ represents a tetravalent aromatic moiety having the formula

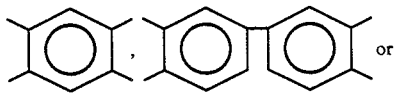

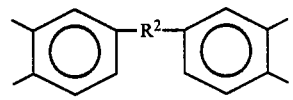

wherein $R^2$ is —O—, —SO$_2$—, or —CH2—$_x$ and x is a positive value; and —Ar$^4$— represents a divalent aromatic moiety having the formula

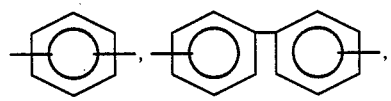

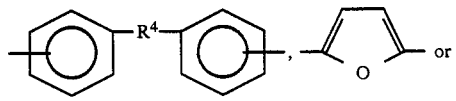

wherein $R^4$ is —O—, —CH2—$_x$ or —Si(CH$_3$.)$_2$—O—Si(CH$_3$)$_2$ and x is a positive integer.

3. A composition as claimed in claim 1 in which the composition is mostly comprised of a polybenzimidazole and the polyarylate is present in the composition in an amount sufficient to make the polybenzimidazole more tractable and processable and also less susceptible to moisture.

4. A composition as claimed in claim 1 which comprises from about 50 parts by weight to about 95 parts by weight of a polybenzimidazole and from about 50 parts by weight to about 5 parts by weight of a polyarylate.

5. A composition as claimed in claim 1 which comprises at least about 10 parts by weight of a polyarylate.

6. A composition as claimed in claim 1 in which the composition is mostly comprised of a polyarylate and the polybenzimidazole is present in the composition in an amount sufficient to make the polyarylate less sensitive to solvents and also to increase the thermal stability of the polyarylate.

7. A composition as claimed in claim 1 which comprises from about 50 parts by weight to about 95 parts by weight of a polyarylate and from about 50 parts by weight to about 5 parts by weight of a polybenzimidazole.

8. A composition as claimed in claim 1 which comprises at least about 25 to 30 parts by weight of a polybenzimidazole.

9. A composition as claimed in claim 1 in which the polybenzimidazole is poly-2,2'-(m-phenylene)-5,5'-bibenzimidazole.

10. A composition as claimed in claim 1 in which the polyarylate contains units of the formula

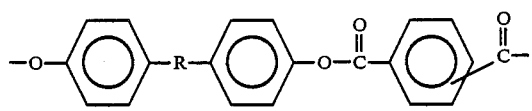

wherein R in the bisphenol moiety represents —C(CH$_3$)$_2$— or —SO$_2$— or —O— and the phthalate moiety may be from isophthalic acid or terephthalic acid or a mixture of the two.

11. A composition as claimed in claim 10 in which the phthalate moiety

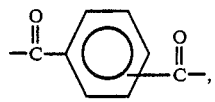

of the polyarylate is comprised of a mixture of isophthalic acid and terephthalic acid moieties in a ratio ranging from 99% isophthalic acid to 1% terephthalic acid and 1% isophthalic acid to 99% terephthalic acid.

12. A composition as claimed in claim 1 which is subsequently phase separated.

13. A film, fiber or fibret prepared from the miscible compositions of claim 1.

14. A film, fiber or fibret as claimed in claim 13, in which the polyarylate has the following unit formula:

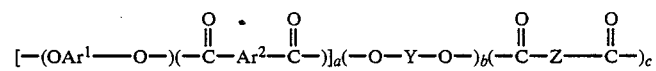

wherein Ar$^1$ and Ar$^2$ represent divalent aromatic moieties or mixtures thereof; wherein Y represents a divalent aliphatic moiety containing up to 6 carbon atoms, or mixtures thereof;
wherein Z represents a divalent aliphatic moiety containing up to 6 carbon atoms, or mixtures thereof; and wherein a has a value of greater than 0.5 to 1, b is 0 or a value less than 0.5, and c has a value of 0 or a value less than 0.5, the sum of a, b and c being equal to 1;
and the polybenzimidazole contains units of the formula:

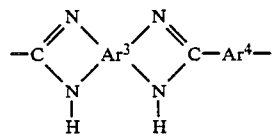

wherein >Ar$^3$< represents a tetravalent aromatic moiety having the formula

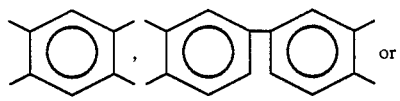

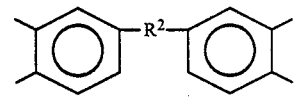

wherein R$^2$ is —O—, —SO$_2$—, or —CH2—$_x$ and x is a positive value; and —Ar$^4$— represents a divalent aromatic moiety having the formula

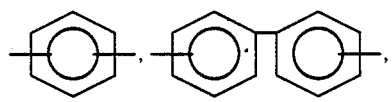

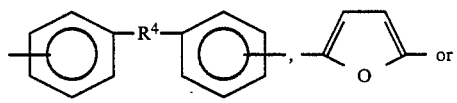

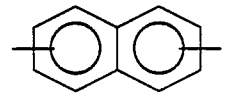

wherein R$^4$ is —O—, or —CH2—$_x$ or —Si(CH$_3$)$_2$—O—Si(CH$_3$)$_2$ and x is a positive integer.

15. A film, fiber or fibret as claimed in claim 13 in which there is present at least about 20 parts by weight of a polybenzimidazole.

16. A film, fiber or fibret as claimed in claim 13 in which there is present at least about 20 parts by weight of a polyarylate.

17. A film, fiber or fibret as claimed in claim 13, in which the polyarylate contains units having the formula:

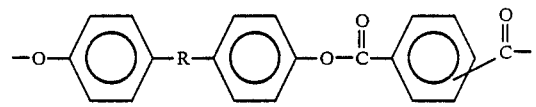

wherein R in the bisphenol moiety represents —C(CH$_3$)$_2$— or —SO$_2$— or —O— and the phthalate moiety may be from isophthalic acid or terephthalic acid or a mixture of the two.

18. A film, fiber or fibret as claimed in claim 13 in which the polybenzimidazole is poly-2,2'-(m-phenylene)-5,5'-bibenzimidazole.

* * * * *